United States Patent
Miyauchi et al.

[11] Patent Number: 5,850,325
[45] Date of Patent: Dec. 15, 1998

[54] MAGNETIC HEAD HAVING A READ ELEMENT UPPER SHIELD FILM AND A WRITE ELEMENT LOWER MAGNETIC FILM SEPARATED BY A NON-MAGNETIC FILM HAVING A THICKNESS SUCH THAT MAGNETIC COUPLING IS ENDUCED THEREBETWEEN

[75] Inventors: Daisuke Miyauchi, Tokyo; Tetsuya Mino, Funabashi, both of Japan

[73] Assignee: TDK Corporation, Tokyo, Japan

[21] Appl. No.: 829,951

[22] Filed: Apr. 1, 1997

[30] Foreign Application Priority Data

| Apr. 2, 1996 | [JP] | Japan | 8-80373 |
| Mar. 5, 1997 | [JP] | Japan | 9-50788 |

[51] Int. Cl.$^6$ ............................. G11B 5/39
[52] U.S. Cl. ............................. 360/113; 360/126
[58] Field of Search ................ 360/113, 121, 360/126

[56] References Cited

U.S. PATENT DOCUMENTS

| 5,168,409 | 12/1992 | Koyama et al. | 360/113 |
| 5,270,895 | 12/1993 | Ruigrok et al. | 360/126 |
| 5,473,492 | 12/1995 | Terunuma et al. | 360/128 |
| 5,528,440 | 6/1996 | Fontana et al. | 360/113 |
| 5,530,609 | 6/1996 | Koga et al. | 360/113 |
| 5,617,275 | 4/1997 | Ogura et al. | 360/113 |
| 5,668,689 | 9/1997 | Schultz et al. | 360/113 |

FOREIGN PATENT DOCUMENTS

| 5-174334 | 7/1993 | Japan . |
| 7-169023 | 7/1995 | Japan . |
| 7-201021 | 8/1995 | Japan . |
| 7-220245 | 8/1995 | Japan . |
| 7-254120 | 10/1995 | Japan . |
| 8-129720 | 5/1996 | Japan . |

OTHER PUBLICATIONS

Y. Ohtsuka, et al., "Recording Characteristics of NiFe/FeN Hybrid Thin Film Head", Japanese Applied Magnetic Academic Society Lecture Abstract Collection, (p. 121), 1992.

N. Matono, et al. "High Track Density Recording by IND/MR Thin Film Head with High Hk Core", Japanese Applied Magnetics Academic Society Lecture Abstract Collection, (p. 133), 1994.

*Primary Examiner*—Jefferson Evans
*Attorney, Agent, or Firm*—Oblon, Spivak, McClelland, Maier & Neustadt, P.C.

[57] ABSTRACT

An MR element and an inductive element are provided. The MR element is provided with a first magnetic shield film and a second magnetic shield film on the two sides of a magnetoresistive film. A first magnetic film of the inductive element and the second magnetic shield film are separated from each other by a non-magnetic film. The non-magnetic film induces magnetic coupling between the second magnetic shield film and the first magnetic film. The width of the first pole portion of the first magnetic film is smaller than the width of the second magnetic shield film and the saturation magnetization of the first magnetic film is higher than the saturation magnetization of the second magnetic shield film.

15 Claims, 7 Drawing Sheets

MAGNETIC HEAD HAVING A READ ELEMENT UPPER SHIELD FILM AND A WRITE ELEMENT LOWER MAGNETIC FILM SEPARATED BY A NON-MAGNETIC FILM HAVING A THICKNESS SUCH THAT MAGNETIC COUPLING IS ENDUCED THEREBETWEEN

BACKGROUND OF THE INVENTION

1. Field of the Invention

The present invention relates to a combined type thin film magnetic head which is employed in a magnetic disk apparatus.

2. Discussion of Background

A great deal of interest has been focused on magnetoresistive conversion elements (hereafter referred to as MR elements) which utilize the magnetoresistance effect because their output voltage is not dependent upon the speed of the recording medium and a high output can be achieved. A thin film head which is provided with an inductive conversion element (hereafter referred to as an inductive element) for recording in combination with an MR element for reproduction is called a combined type thin film magnetic head.

In a combined type thin film magnetic head, an upper magnetic shield film and a lower magnetic shield film are provided via an insulating layer above and under a magnetoresistance effect element that constitutes an MR element. These magnetic shield films are provided to absorb superfluous magnetic flux and to improve the resolution and the high frequency characteristics so that the recording density can be improved.

Magnetic shield films are constituted of material with high permeability and high saturation magnetization and, therefore, Ni—Fe alloys with low coercivity and low magnetostriction force are often used.

Japanese Unexamined Patent Publication No. 169023/1995 discloses an example in which a film constituted by laminating a Ni—Fe alloy over a plurality of layers via intermediate non-magnetic films is employed as a magnetic shield film. It reports that this improves the permeability and that, with the magnetic domain stabilized, a reduction in noise is achieved.

Now, with magnetic disk apparatuses becoming more and more miniaturized, it is desired that the gap between the upper and lower shields in a magnetic head be reduced in order to support higher recording density. In addition, in a combined type thin film magnetic head, which is provided with both an MR element and an inductive element, it is necessary to position the two magnetic conversion elements as close as possible.

As a means for meeting these requirements, a structure in which the upper magnetic shield film also functions as the lower magnetic film of the inductive element is employed.

This structure is disclosed in Japanese Unexamined Patent Publication No. 44917/1976.

However, in an inductive element in which the upper magnetic shield film also functions as a lower magnetic film, no pole is formed at the lower magnetic film at the slider surface (air bearing surface). Because of this, when a write is performed with an inductive element in which the upper magnetic shield film constitutes the lower magnetic shield film, the recording is less clear (recording fringing occurs) compared to a write performed with an inductive element provided with an upper pole and a lower pole.

In recent years, it has become extremely vital to narrow the tracks due to increases in recording density, and the recording state achieved with a narrow track pitch has become an important factor to be considered along with reproduction efficiency. Thus, the solution to the problem of the recording fringing described above has become a critical matter. On page 133 of Japanese Applied Magnetics Academic Society Lecture Abstract Collection (1994), a pole trimming design appears in which the widths of the upper and lower cores (the width of the upper and lower poles) are matched in order to eliminate the recording fringing attributed to the head design. However, it does not refer to a design structure in which the upper magnetic shield film also functions as a lower magnetic film.

In addition, in order to support the higher recording density, the coercivity in the recording medium has been increased and this necessitates an increase in the recording capability of the inductive element. This may be achieved by raising the saturation magnetization of the inductive element, and a great number of materials such as Fe—N group materials are being considered. For instance, on page 121 of Japanese Applied Magnetics Academic Society Lecture Abstract Collection (1992), the recording/reproduction characteristics of a combined type thin film magnetic head whose second magnetic film is constituted of a NiFe/FeN film are disclosed.

A high saturation magnetization and a high permeability are positive characteristics in a magnetic shield film, too, since they improve the shielding effect. However, when a shielding material with a high permeability is employed, since the magnetic shield film absorbs the magnetic flux that should normally be taken into the magnetoresistive (MR) film as well, the reproduction sensitivity is lowered. As a means for solving this problem, Japanese Unexamined Patent Publication No. 174334/1993 discloses a structure in which a magnetic shield film whose permeability is lower than that of the MR film is employed. However, this publication does not refer to a structure of the upper magnetic shield film that should be achieved when adopting the structure in which the upper magnetic shield film also functions as the lower magnetic film of the inductive element.

Furthermore, as recording density increases and the insulating layer of the MR element becomes thinner, the influence of the magnetic shield films on the reproduction sensitivity and output fluctuation is no longer insignificant. In particular, if a spin valve film is used to constitute the MR element, since the film thickness of the external magnetic field response film is smaller than that of a normal magnetic anisotropic MR film and the rotation angle of magnetization is great, the influence of the static magnetic field applied by the magnetic shield films becomes also great.

SUMMARY OF THE INVENTION

It is an object of the present invention to provide a combined type thin film magnetic head that is provided with an inductive element for recording in combination with an MR element for reproduction that achieves a high output voltage without being dependent upon the speed of the recording medium.

It is a further object of the present invention to provide a combined type thin film magnetic head that achieves an improvement in resolution and high frequency characteristics by absorbing magnetic flux that is superfluous to the MR element.

It is a still further object of the present invention to provide a combined type thin film magnetic head with a structure wherein the elements are positioned in a desirable manner, i. e., the MR element and the inductive element are positioned close to each other.

It is a still further object of the present invention to provide a combined type thin film magnetic head structured in such a manner that a second magnetic shield film of the MR element and a first magnetic film of the inductive element are placed adjacent to each other, in which the second magnetic shield film and the first magnetic film can be formed independently of each other with materials that can achieve the characteristics required of the individual films.

It is a still further object of the present invention to provide a combined type thin film magnetic head with which an improvement in the write capability and the recording density is achieved and in which side fringing can be prevented.

It is a still further object of the present invention to provide a combined type thin film magnetic head with which reduction in the reproduction sensitivity and deterioration in the stability of the MR element due to the influence of the magnetic shield films can be avoided while still achieving an improvement in the recording capability.

It is a still further object of the present invention to provide a combined type thin film magnetic head that can achieve a clear recording state while still retaining a compact head structure.

It is a still further object of the present invention to provide a combined type thin film magnetic head that is capable of fully providing the magnetic shielding function while achieving a clear recording state.

It is a still further object of the present invention to provide a method for manufacturing the combined type magnetic heads described above.

In order to achieve the objects described above, the combined type thin film magnetic head according to the present invention is provided with an MR element and an inductive element.

The MR element includes an MR film, a first magnetic shield film and a second magnetic shield film, with the first magnetic shield film and the second magnetic shield film provided on the two sides of the MR film.

The inductive element is provided with a thin film magnetic circuit constituted with a first magnetic film, a coil film which is supported by an insulating film, a second magnetic film and a gap film, and is combined with the MR element with the first magnetic film placed as if to lie adjacent to the second magnetic shield film.

The first magnetic film and the second magnetic shield film are separated from each other by a non-magnetic film, and the film thickness of the non-magnetic film is selected at a value which induces magnetic coupling between the second magnetic shield film and the first magnetic film.

The first magnetic film is provided with a first pole tip and the width of the first pole tip is smaller than the width of the second magnetic shield film. Furthermore, the saturation magnetization of the first magnetic film is higher than the saturation magnetization of the second magnetic shield film.

The combined type thin film magnetic head according to the present invention described above is provided with the MR element and the inductive element. As a result, a combined type thin film magnetic head, which is provided with an inductive element for recording in combination with an MR element for reproduction which achieves a high output voltage without being dependent upon the speed of the recording medium, is achieved.

In addition, since the first magnetic shield film and the second magnetic shield film are provided on either side of the MR film in the MR element, superfluous magnetic flux is absorbed by the first magnetic shield film and the second magnetic shield film, thereby achieving an improvement in resolution and in high frequency characteristics.

Furthermore, since the inductive element is provided with a thin film magnetic circuit constituted with the first magnetic film, the coil film supported by the insulating film, the second magnetic film and the gap film, it is possible to generate a write magnetic field at the gap film in correspondence to the electric current running to the coil film.

Moreover, since the inductive element is combined with the MR element with its first magnetic film placed as if to be adjacent to the second magnetic shield film, a structure with desirable element positioning is achieved, with the two magnetic conversion elements placed close to each other.

The first magnetic film included in the inductive element and the second magnetic shield film are separated from each other by a non-magnetic film. In such a structure, it is possible to form the second magnetic shield film and the first magnetic film independently of each other using materials that can achieve characteristics required of the individual films.

The film thickness of the non-magnetic film is selected at a value such that magnetic coupling is induced between the second magnetic shield film and the first magnetic film. In this structure, the write capability and the recording density are improved and side fringing is prevented with the magnetic coupling induced between the second magnetic shield film and the first magnetic film. The thickness of the non-magnetic film is a vital factor when inducing magnetic coupling between the second magnetic shield film and the first magnetic film. If it is too great, the magnetic coupling between the second magnetic shield film and the first magnetic film will be insufficient, whereas if it is too small, a defective film will result, due to pin holes or the like. Thus, the thickness of the non-magnetic film must be set at a value which ensures that such problems do not occur.

In addition, since the saturation magnetization of the first magnetic film is higher than the saturation magnetization of the second magnetic shield film, an improvement in the recording capability is achieved and a reduction in the reproduction sensitivity and degradation in the stability of the MR element due to the influence of the magnetic shield films can be avoided.

Furthermore, the width of the first pole tip constituting the inductive element is smaller than the width of the second magnetic shield film. In such a structure, since a pole tip of the first magnetic film is formed at the air bearing surface, a clear recording state can be achieved.

Even more desirable, the width of the first pole tip should be set approximately the same as the width of the second pole tip of the second magnetic film. This will achieve an even clearer recording state.

BRIEF DESCRIPTION OF THE DRAWINGS

These and other advantages, features and objects of the present invention will be understood by those of ordinary skill in the art referring to the annexed drawings, given purely by way of non-limitive example, in which.

DETAILED DESCRIPTION OF THE PREFERRED EMBODIMENTS

Referring to FIGS. 1 to 4, the combined type thin film magnetic head is provided with an MR element 200 which is employed as a read element and an inductive element 300 which is employed as a write element on a base body 100 which constitutes a slider. While a structure in which the inductive element 300 is laminated onto the MR element 200 is disclosed in this embodiment, a structure in which the MR element 200 is laminated onto the inductive element 300 may be adopted.

The base body 100 is constituted of a ceramic structure such as $Al_2O_3$—TiC, and an insulating film 120 constituted of $Al_2O_3$, $SiO_2$ or the like is provided on the base body 100. The base body 100 is provided with an air bearing surface (hereafter referred to as the ABS surface) 130 at one surface which faces opposite the magnetic disk. Base bodies in the known art include a type in which a rail portion is provided at the surface that faces opposite the magnetic disk with the surface of the rail portion constituting the ABS surface, a type in which the surface facing opposite the magnetic disk is a flat surface without a rail portion, with almost the entire surface constituting the ABS surface, and the like.

A first magnetic shield film (lower magnetic shield film) 400 is laminated onto the insulating film 120, and an insulating film 500 is laminated onto the first magnetic shield film 400. The insulating film 500 is constituted of $Al_2O_3$, $SiO_2$ or the like. A second magnetic shield film (upper magnetic shield film) 311 is provided on the insulating film 500.

The MR element 200 is provided embedded in the insulating film 500. The MR element 200 is provided with an MR film 210 and a lead conductor 220.

The inductive element 300, which is provided with a first magnetic film (lower magnetic film) 312, a second magnetic film (upper magnetic film) 320, a coil film 330, a gap film 340 that may be constituted of alumina or the like, an insulating film 350 constituted of an organic resin such as Novolak resin, and a protective film 360, is laminated onto the insulating film 500. The front end portions of the first magnetic film 312 and the second magnetic film 320 constitute pole tips P1 and P2 which face opposite each other over the gap film 340, whose thickness is very small, and write is performed at the pole tips P1 and P2.

The yolked portions of the first magnetic film 312 and the second magnetic film 320 are linked with each other so that they complete a magnetic circuit at the back gap portion which is on the opposite side from the pole tips P1 and P2. The coil film 330 is formed on the insulating film 350 in such a manner that it winds around the linking portion of the yolked portions in a coil.

In the combined structure described above, the film thickness of the non-magnetic film 313 is selected at a value which induces magnetic coupling between the second magnetic shield film 311 and the first magnetic film 312. In such a structure, with magnetic coupling induced between the second magnetic shield film 311 and the first magnetic film 312, it is possible to achieve an improvement in the write capability and the recording density while preventing side fringing. The film thickness of the non-magnetic film 313 is an important factor with respect to inducing magnetic coupling between the second magnetic shield film 311 and the first magnetic film 312. If the thickness is too large, the magnetic coupling between the second magnetic shield film 311 and the first magnetic film 312 will be insufficient, whereas if it is too small, a defective film is likely to result, due to pin holes and the like. The thickness of the non-magnetic film 313 must be set at a value that ensures that these problems do not occur. As a correlation for setting the thickness of the non-magnetic film 313, it must be smaller than the thickness of the second magnetic shield film 311 and the first magnetic film 312. For instance, if the film thicknesses of the first magnetic film 312 and the second magnetic shield film 311 are at approximately 1 to 1.2 $\mu$m, the thickness of the non-magnetic film 313 should be set within a range of 0.01 to 0.2 $\mu$m or, more specifically, it should be set at approximately 0.05 $\mu$m. Another correlation is that the film thickness of the non-magnetic film 313 should be set smaller than the film thickness of the gap film 340 of the inductive element.

Figure 4:
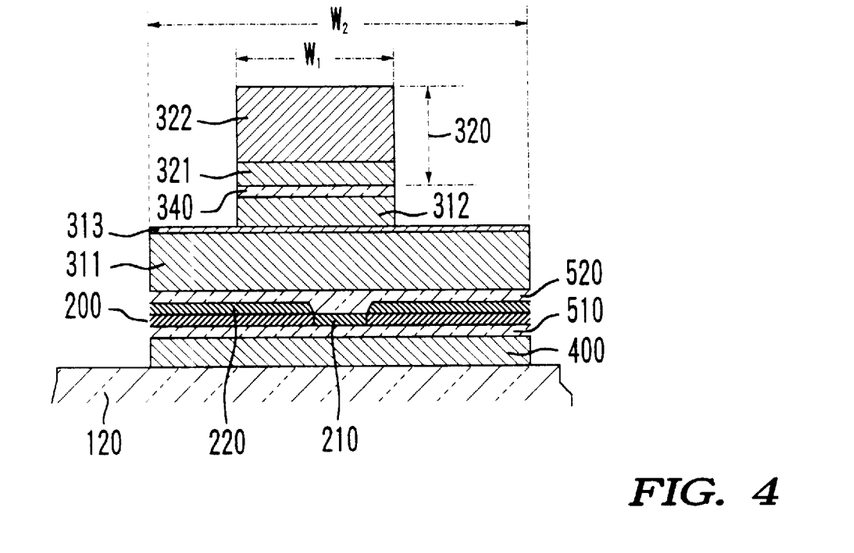
FIG. 4 is an enlarged frontal cross section of the magnetic conversion element portion of the combined type thin film magnetic head shown in FIG. 3.

In addition, the first magnetic film 312 is provided with the first pole tip P1, with the width W1 of the first pole tip P1 set smaller than the width W2 of the second magnetic shield film 311 (see FIG. 4).

Since the width W1 of the first pole tip P1 of the first magnetic film 312 constituting the inductive element 300 is set smaller than the width W2 of the second magnetic shield film 311, it is possible to form the pole tip P1 of the first magnetic film 312 at the air bearing surface 130 to achieve a clear recording state.

In the embodiment, the width W1 of the first pole tip P1 is set approximately the same as the width of the second pole tip P2 of the second magnetic film 320. This achieves an even clearer recording state.

The required width and area can be assured for the second magnetic shield film 311 in spite of the reduction in the width of the first pole tip P1. As a result, the original function of the second magnetic shield film 311, i. e., a function of absorbing superfluous magnetic flux, can be entirely fulfilled.

Moreover, the second magnetic shield film 311 and the first magnetic film 312 are separated from each other by the non-magnetic film 313. This means that the second magnetic shield film 311 and the first magnetic film 312 can be formed independently of each other using materials that achieve the characteristics that are required of the individual films.

The second magnetic shield film 311 is constituted of a material whose saturation magnetization is lower than the saturation magnetization of the first magnetic film 312. This achieves an improvement in the recording capability and also assures that a reduction in the reproduction sensitivity and degradation of stability of the MR element 200 due to the influence of the magnetic shield films are minimized.

The first magnetic shield film 400 which is positioned under the MR element 200 may be constituted of a low saturation magnetization material whose saturation magnetization is smaller than the saturation magnetization of the MR film 210. By using such a material with a low saturation magnetization, it is possible to increase the reproduction sensitivity of the magnetic head with the influence applied by the first magnetic shield film 400, which, in turn, achieves an improvement in the output voltage.

The first magnetic film 312 may be constituted of an Fe—Zr—N alloy whose saturation magnetization is larger than that of a Ni—Fe alloy. Such a material with a high saturation magnetization is employed in order to achieve an improvement in recording characteristics such as the overwrite characteristics, as known to persons skilled in the art. While an alloy with the composition described earlier is employed in the embodiment, the composition of the material is not limited to this, and other ternary alloys constituted of Co, Fe and Ni, for instance, may be used.

A Ni—Fe—Ta alloy whose saturation magnetization is smaller than that of a Ni—Fe alloy is used to constitute the second magnetic shield film 311. As explained earlier material with a low saturation magnetization is used to constitute the second magnetic shield film 311 because, if a material with a high saturation magnetization were used, the influence of the static magnetic field applied by the magnetic shield films would be strong enough to diminish the magnetic inversion of the magnetic field response magnetic film, which, in turn, would reduce the sensitivity. In addition, as explained in Japanese Unexamined Patent Publication No. 174334/1993, if the permeability and the saturation magnetization of a magnetic shield film are too large, the magnetic flux which should normally be taken into the MR film will also be absorbed by the magnetic shield film, resulting in a reduction in the sensitivity. However, if the permeability is reduced to a significant extent, the function as the magnetic shield film will not be fulfilled fully. Thus, in this embodiment, a material with a composition as described above, with a relatively high permeability and a small saturation magnetization, is used to constitute the magnetic shield film. While the alloy with the composition scheme described above is employed in this embodiment, the magnetic shield film may also be constituted of any one of the Ni—Fe metal alloys, such as Ni—Fe—Cr, Ni—Fe—Nb and Ni—Fe—Rh, Co-metal amorphous alloys and the like.

Au, Ag, Ti and or Ta may be used to constitute the non-magnetic film 313. However, as long as no problem is caused during the manufacturing process, other metals or oxides may be used.

The film thicknesses of the second magnetic shield film 311, the first magnetic film 312 and the non-magnetic film 313 may be set, for instance, at approximately 2 µm, approximately 1 µm and approximately 0.05 µm respectively.

Figure 1:
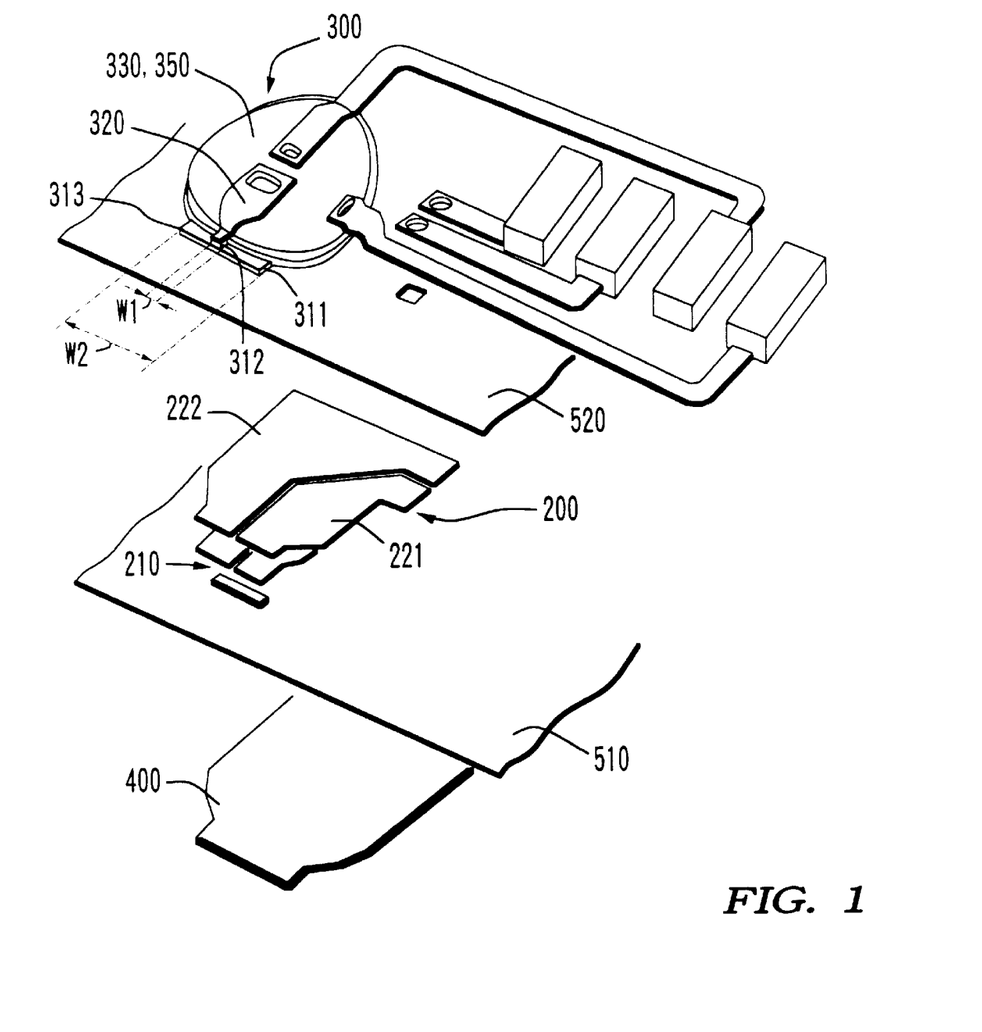
FIG. 1 is a perspective of the combined type thin film magnetic head according to the present invention in a disassembled state.
Figure 2:
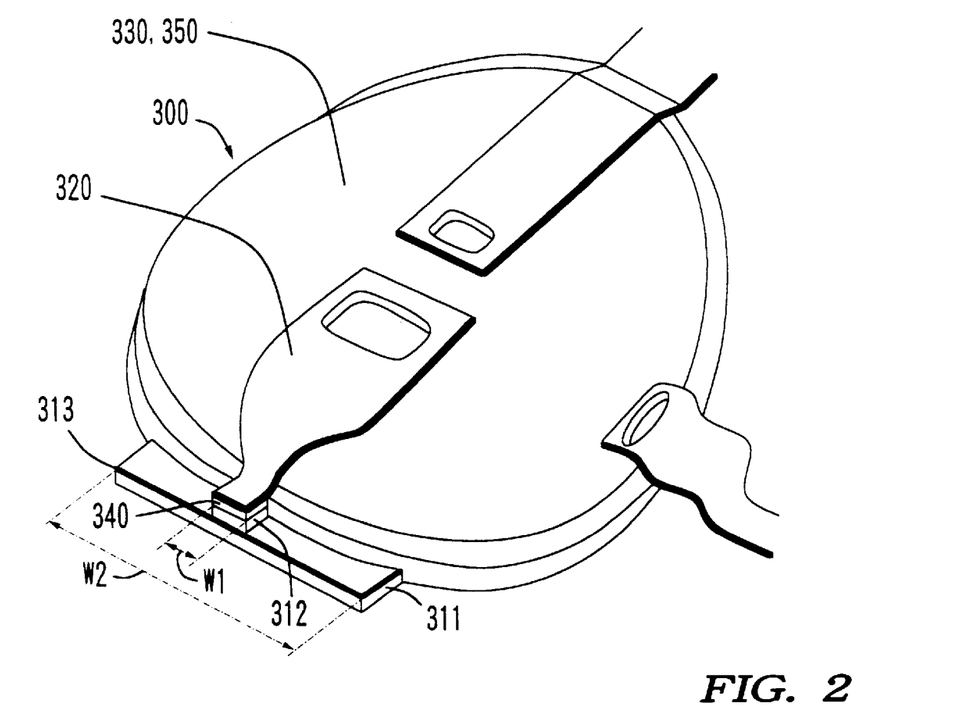
FIG. 2 is an enlarged view showing the magnetic conversion element portion of the combined type thin film magnetic head shown in FIG. 1 in a disassembled state.
Figure 3:
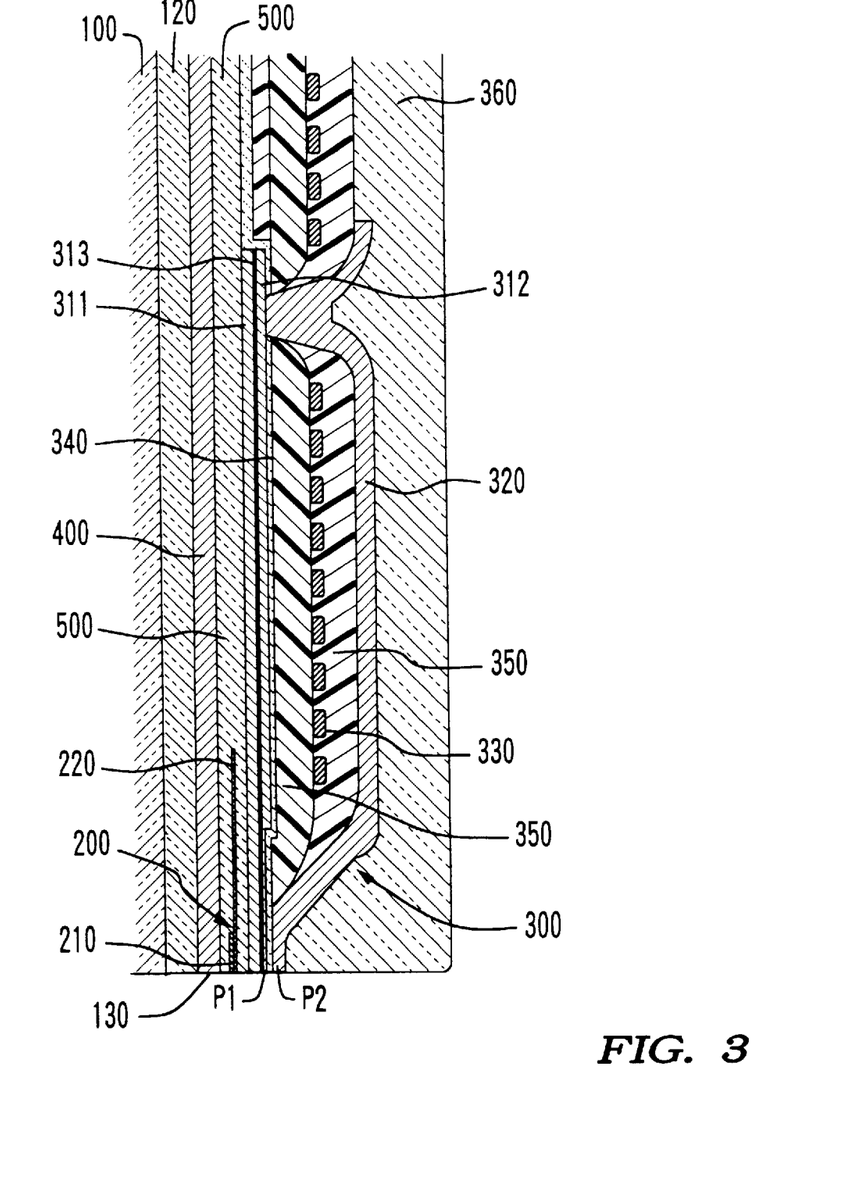
FIG. 3 is a cross section of the combined type thin film magnetic head shown in FIG. 1.
Figure 6:
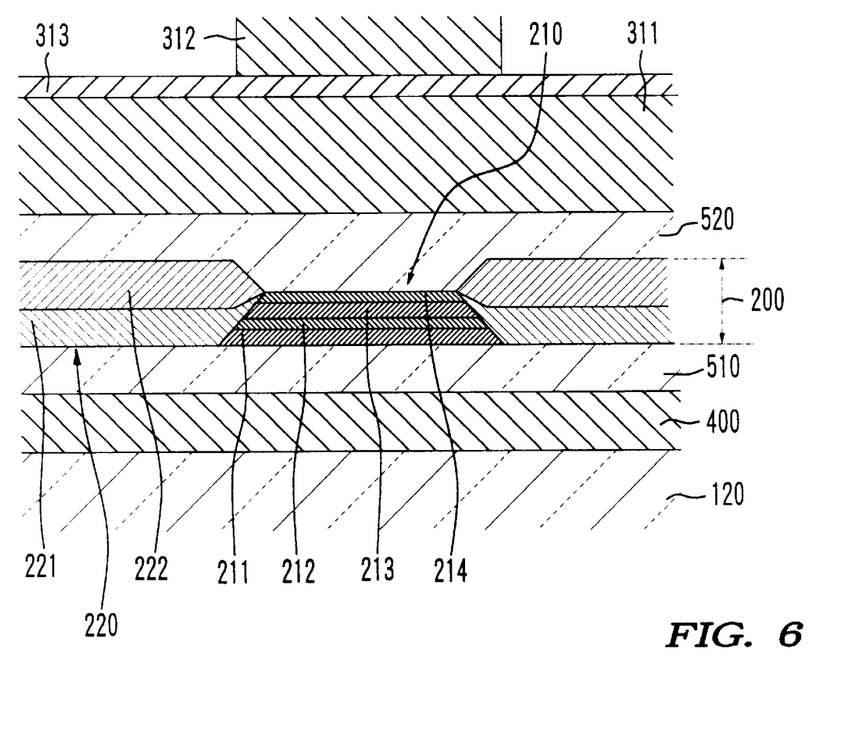
FIG. 6 is an enlarged cross section of the magnetoresistance effect element portion constituted of a spin valve film.

FIG. 6 is an enlarged cross section showing the structure in further detail of the MR element 200 included in the combined type thin film magnetic head shown in FIG. 1. The first magnetic shield film 400, an insulating film 510, the MR element 200, an insulating film 520 and the second magnetic shield film 311 are sequentially laminated on a base insulating film 120 which is laminated onto the base body 100 (not shown).

The MR film 210, which constitutes the MR element 200 may be constituted by using an anisotropic MR film, but it is more desirable to constitute it with a spin valve film. The MR film 210 in the figure is constituted of a spin valve film. The spin valve film in the figure includes a magnetic field response film (first ferromagnetic film) 211, a non-magnetic film 212, a pinned ferromagnetic film (second ferromagnetic film) 213 and an anti-ferromagnetic film 214. It goes without saying that a film structure other than the film structure described above may be adopted for the spin valve film.

The MR film 210 constituted of the spin valve film is formed to have a track width of, for instance, 2.5 µm, and is provided with a lead conductor 221 at each end. The lead conductors 220 are each provided with a Co—Pt alloy film 221 and an electrode film 222. The Co—Pt alloy film 221 is provided to impart magnetic domain control on the magnetic field response film 211 of the spin valve film by applying a bias magnetic field to the spin valve film.

The spin valve film in the figure has the following specific film structure. First, the magnetic field response film 211 is constituted of a NiFe film with a film thickness of approximately 0.1 µm. Under the magnetic field response film 211, a base film which is constituted of a Ta film with a film thickness of approximately 0.05 µm is provided. The non-magnetic film 212 is a Cu film with a film thickness of approximately 0.025 µm. The pinned ferromagnetic film 213 is constituted of a NiFe film with a film thickness of approximately 0.05 µm. The anti-ferromagnetic film 214 is constituted of a FeMn film with a film thickness of approximately 0.1 µm and is provided with a protective film constituted of a Ta film with a film thickness of approximately 0.05 µm. However, this film structure with the specific values for the individual film thicknesses is given purely by way of example and does not impose any restrictions upon the film structure or film thicknesses and another film structure may be employed.

A Ni—Fe—Ta alloy thin film may be used to constitute the first magnetic shield film 400. The Ni—Fe—Ta alloy thin film is a material with a low saturation magnetization and it is used for the same reasons as those stated earlier.

The second magnetic film 320 is a two-layer film constituted with a first layer 321 and a second layer 322. Fe—Zr—N may be used to constitute the first layer 321 and a Ni—Fe film may be used to constitute the second layer 322. The Fe—Zr—N alloy film is a material with a high saturation magnetization and improves the recording characteristics. Although it is preferable to constitute the second magnetic film 320 with a single layer Fe—Zr—N film since a higher saturation magnetization is achieved, it is constituted in this embodiment as a laminated film comprising the first layer 321 constituted of F—Zr—N and the second layer 322 constituted of Ni—Fe for reasons related to manufacturing method. Their film thicknesses may be set at, for instance, approximately 0.5 µm for the first layer 321 and approximately 2 µm for the second layer 322.

$Al_2O_3$ may be used to constitute the insulating film 500 of the MR element 200. Its film thickness is set at 0.12 µm for the insulating film 510 between the first magnetic shield film 400 and the MR film 210, and at approximately 0.1 µm for the insulating film 520 between the MR film 210 and the second magnetic shield film 311. A photoresist film is used to constitute the insulating film 350 of the inductive element 300.

Next, the method for manufacturing a combined type thin film magnetic head according to the present invention is explained in reference to FIGS. 7 to 11.

First, the spin valve film constituting the MR film was formed through ion beam sputtering. The film was formed under the following conditions: the ultimate vacuum was less than 5×10⁻⁵ Pa with the vacuum at the time of film formation at approximately 1.2×10⁻² Pa, the Ar gas flow rate at 7 sccm, the acceleration voltage of the sputter gun at 300V and the ion current at 30 mA. It is to be noted that a magnetic field of approximately 100 Oe was applied when forming each film. The film structure was as follows:

base film; Ta film,
film thickness=0.05 μm
magnetic field response film; NiFe film,
film thickness=0.1 μm
non-magnetic film; Cu film,
film thickness=0.025 μm
pinned ferromagnetic film; Co film,
film thickness=0.03 μm
anti-ferromagnetic film; FeMn film,
film thickness=0.1 μm
protective film; Ta film,
film thickness=0.05 μm In the film structure above, the MR change rate was 4.5% and the magnetic field sensitivity was 0.5%/Oe.

The Ni—Fe—Ta films used to constitute the first magnetic shield film 400 and the second magnetic shield film 311 are formed through RF magnetron sputtering. The RF magnetron sputtering film formation was performed under the following conditions: the ultimate vacuum was less than 1×10⁻⁴ Pa with the vacuum at the time of film formation at approximately 4×10⁻¹ Pa, the Ar gas flow rate at 30 sccm and the RF power at 1000 W. The composition of the formed Ni—Fe—Ta film was (Ni—18Fe) –7.2 Ta (at %) and the film thus formed has magnetic characteristics such that the saturation magnetization was 7 kGauss and the permeability was at 1800. The film thickness of the first magnetic shield film was at 1 μm whereas the film thickness of the upper shield lower layer film was at 2 μm.

The Fe—Zr—N film used to constitute the first magnetic film 312 was also formed through RF magnetron sputtering. The film was formed through RF magnetron sputtering under the following conditions: the ultimate vacuum being less than 1×10⁻⁴ Pa with the vacuum at the time of film formation at approximately 4×10⁻¹ Pa, the AR gas flow rate at 25 sccm and the RF power at 1400 W. The composition of the Fe—Zr—N film thus formed was Fe—7Zr—8N (at %) and the film has magnetic characteristics such that the saturation magnetization was 14 kGauss and the permeability was at 2500. Its film thickness was 1 μm.

Figure 5:
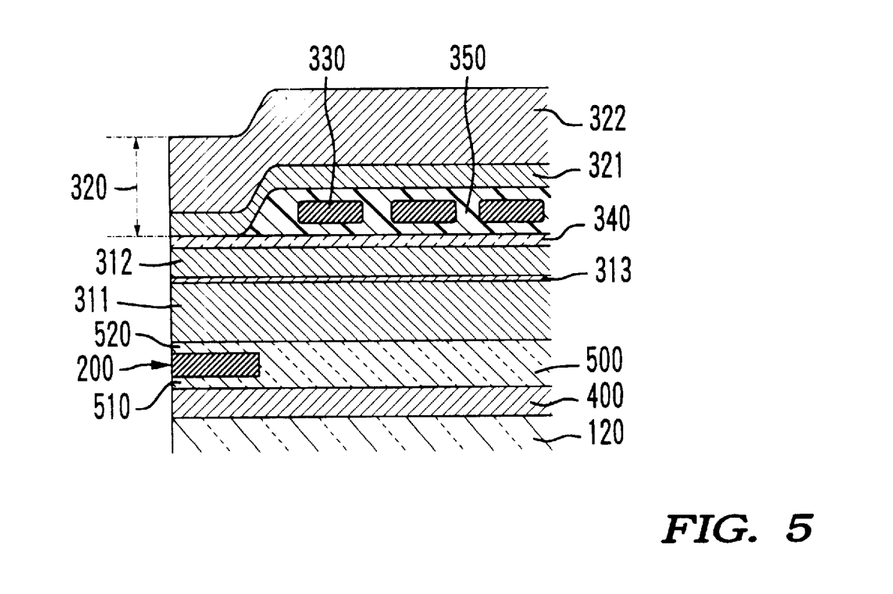
FIG. 5 is an enlarged side cross section of the combined type thin film magnetic head shown in FIG. 3.

An Al₂O₃ film, which was formed to constitute the insulating film 340 to function as a write gap, was formed on the first magnetic film 312, and on top of it the insulating film 350 constituted of photoresist and the coil film 330 supported by the insulating film 350 are formed (see FIG. 5, for instance).

Figure 7:
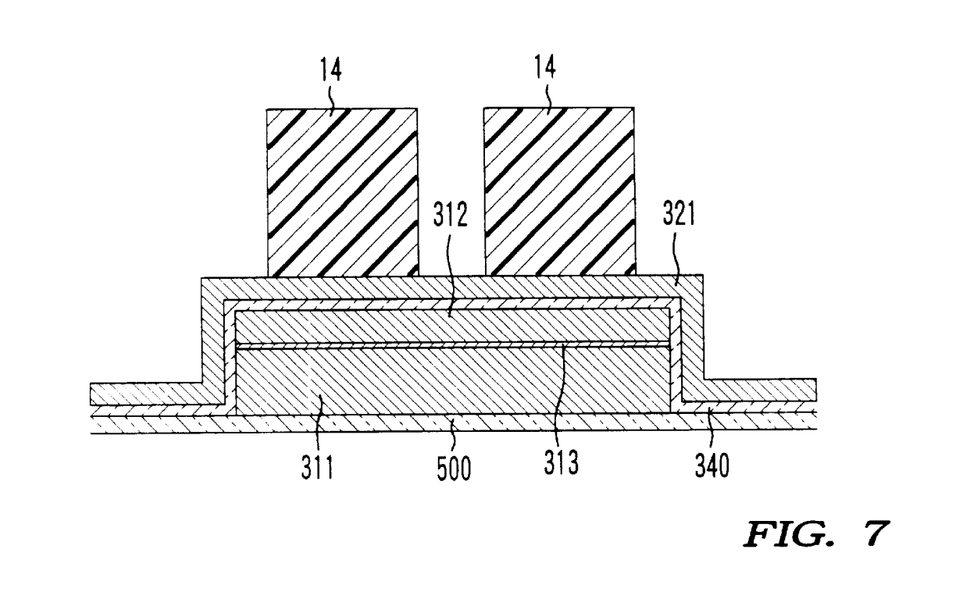
FIG. 7 shows a process included in the method for manufacturing a combined type thin film magnetic head according to the present invention.

An Fe—Zr—N alloy film was formed on the insulating film 350, through RF magnetron sputtering, to constitute the second magnetic film 321. On top of this, a frame 14, constituted of photoresist, was formed. FIG. 7 shows the state achieved after the process described above was completed.

Figure 8:
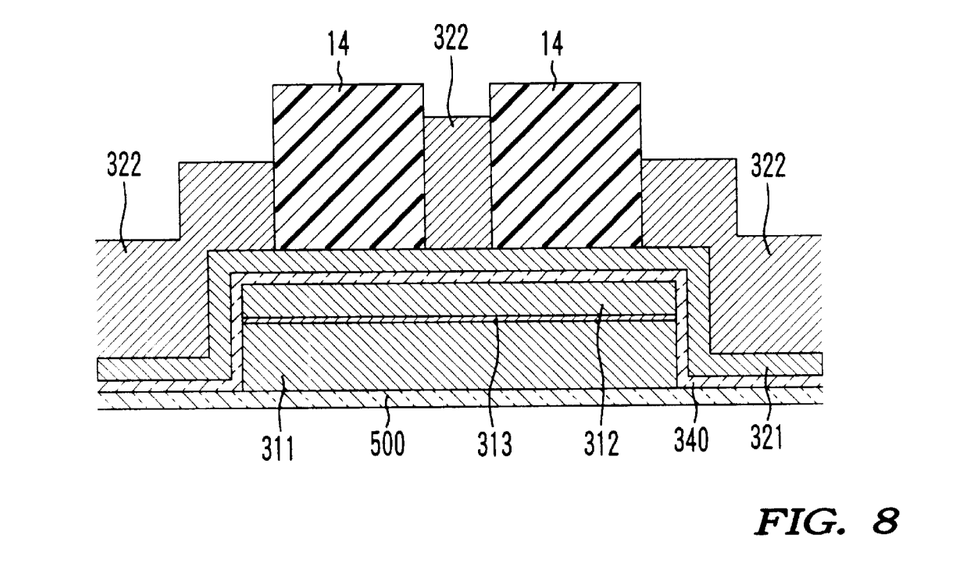
FIG. 8 shows a process that is executed after the process shown in FIG. 7.

Next, as shown in FIG. 8, a Ni—Fe alloy film which is to constitute the upper layer 322 of the second magnetic film 320 was formed through frame plating.

Figure 9:
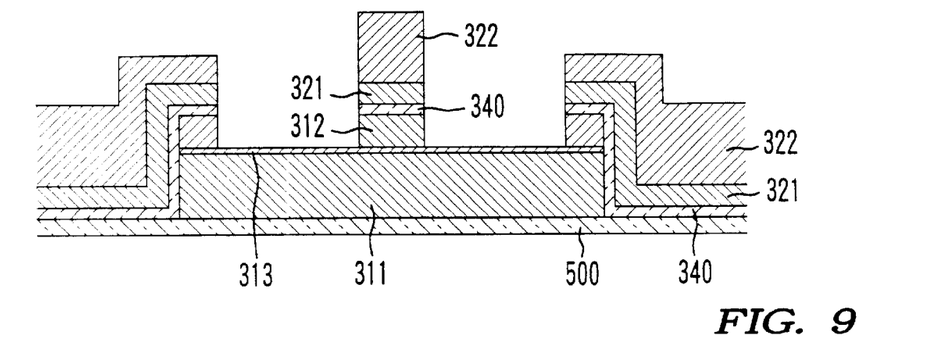
FIG. 9 shows a process that is executed after the process shown in FIG. 8.

Then, after removing the frame 14, ion milling was performed on the portion that has been covered by the frame until the Au constituting the non-magnetic film 313 was reached, by using the Ni—Fe alloy film 322 which has been formed through plating as a sacrifice mask. FIG. 9 shows the state achieved when this process was completed.

Figure 10:
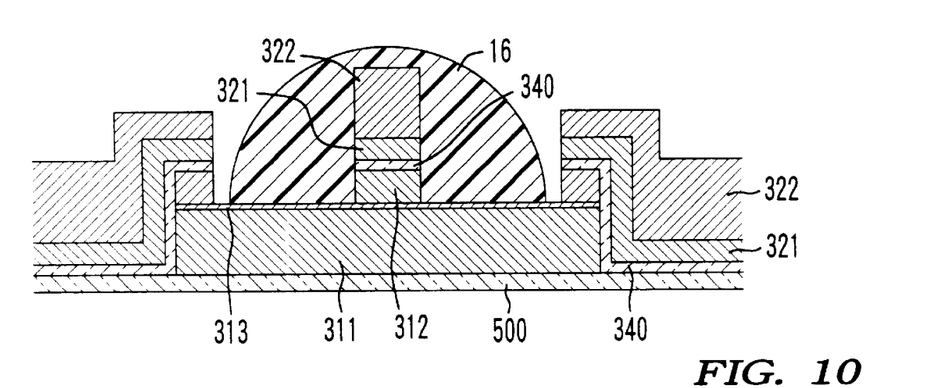
FIG. 10 shows a process that is executed after the process shown in FIG. 9.

After this, a cover 16 was provided by resist on the pole tips as shown in FIG. 10, and then finally, chemical etching was performed before the cover resist was removed. Thus, the structure shown in FIG. 11 was formed.

Figure 11:
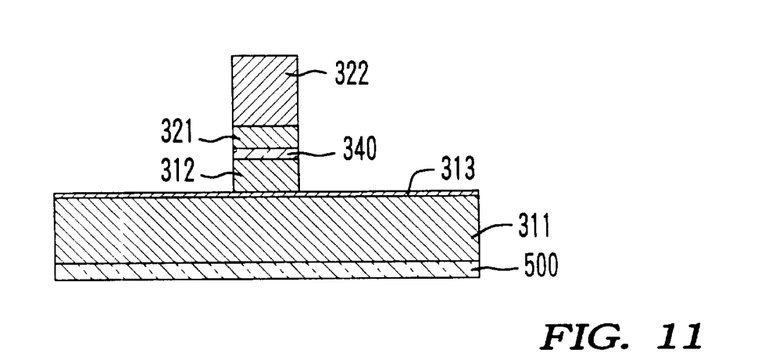
FIG. 11 shows a process that is executed after the process shown in FIG. 10.

In this structure, the cover resist and the Au constituting the non-magnetic film 313 are not eroded by the etchant. This makes it possible to prevent the second magnetic shield film 311 from being damaged by the etchant.

A combined type thin film magnetic head with its upper shield/first magnetic film constituted as a NiFe single layer film was also prepared to present an example for comparison against the combined type thin film magnetic head according to the present invention, and the electromagnetic conversion characteristics of the two magnetic heads were compared. It is to be noted that the film thickness of the NiFe single layer film was set at 2.5 μm. In this structure, the coil of the write head was at 14 T, the recording gap length at 0.35 μm, the length of the gap between the shields at 0.28 μm, the height of the MR element at 1.5 μm, the throat height at 1.4 μm, the width of the write track at 3.2 μm and the width of the read track at 2.5 μm. Media at 200 Oe with their tBR at 100 Gμm were used.

Table 1 shows the results of off-track characteristics measurement.

TABLE 1

| Second magnetic shield/ first magnetic film material | Optical write track width (μm) | Effective write track width (μm) | Recording fringing quantity (μm) |
|---|---|---|---|
| NiFeTa/Au/FeZrN | 3.24 | 3.27 | 0.03 |
| NiFe (example for comparison) | 3.25 | 3.54 | 0.29 |

In this measurement, the effective write track width is obtained as the PW50 of the corresponding off track profile. The measurement was performed with the line recording density at 20 kFCI and the flying height at 70 nm.

With the recording fringing determined as the difference between the optical write track width and the effective write track width, the fringing quantity is smaller when the first magnetic film is constituted as a two-layer film with a pole formed at the upper layer. This proves that the structure according to the present invention achieves a clearer recording state.

The advantage achieved by constituting the pole with a material with high magnetic flux density are listed below. If the saturation magnetization is low at the pole and the recording current is increased, the magnetization transition region of the medium expands due to the magnetic saturation at the front end of the pole, resulting in reduced output. The results of the measurement of the saturation characteristics of the output voltage indicate that, with the line recording density at which the standardized output is halved (½) designated D50, while the D50 in the example for comparison is approximately 110 kFCI, a value of approximately 115 kFCI is achieved in the structure according to the present invention. It may be safely assumed that this difference is attributable to the difference in the recording magnetic field distribution.

Table 2 shows the output voltages and the PW50 of the output voltage waveforms in the combined type thin film magnetic head according to the present invention and the combined type thin film magnetic head in the example for comparison. It is to be noted that the sense current value was set at 6 mA.

TABLE 2

| Second magnetic shield / first magnetic film material | Output voltage (μVp-p) | PW50 (nm) |
| --- | --- | --- |
| NiFeTa/Au/FeZrN | 920 | 378 |
| NiFe (example for comparison) | 700 | 380 |

The results shown in FIG. 2 indicate that when a Ni—Fe—Ta alloy film with a low saturation magnetization of 7 kGauss is used to constitute the second magnetic shield film 311, which is placed adjacent to the MR film 210, the output voltage improves because the influence of the static magnetic field applied by the magnetic shield film 311 to the magnetic field response film of the spin valve film is reduced or because the magnetic flux is not absorbed more than necessary. In addition, it is verified that there is no significant difference in the PW50 of the output voltage waveform regardless of which material is used to constitute the second magnetic shield film, its function as the magnetic shield film being fulfilled in either case.

It is to be noted that since, if a material with an extremely low saturation magnetization and an extremely low permeability is used to constitute the first magnetic shield film, its function as the magnetic shield film naturally becomes insufficient and the PW50 of the output voltage waveform expands as a result, it is necessary to select a material that achieves an improvement in output voltage without spreading the PW50 as in the embodiment.

While the invention has been particularly shown and described with reference to preferred embodiment thereof, it will be understood by those skilled in the art that various changes in form and detail may be made therein without departing from the spirit, scope and teaching of the invention.

What is claimed is:

1. A combined type thin film magnetic head comprising:
   a magnetoresistive conversion element including a magnetoresistive film, a first magnetic shield film and a second magnetic shield film with said first magnetic shield film and said second magnetic shield film provided at either side of said magnetoresistive film; and
   an inductive conversion element being provided with a thin film magnetic circuit constituted with a first magnetic film, a coil film supported by an insulating film, a second magnetic film and a gap film, and being combined with said magnetoresistive conversion element with said first magnetic film placed as if to be adjacent to said second magnetic shield film, said first magnetic film and said second magnetic shield film are separated from each other by a non-magnetic film with a film thickness of said non-magnetic film selected at a value such that magnetic coupling is induced between said second magnetic shield film and said first magnetic film to significantly reduce side fringing, and said first magnetic film is provided with a first pole portion with a width thereof set smaller than a width of said second magnetic shield film, and a saturation magnetization of said first magnetic film is higher than a saturation magnetization of said second magnetic shield film.

2. A combined type thin film magnetic head according to claim 1, wherein:
   said film thickness of said non-magnetic film is smaller than said film thickness of said second magnetic shield film or a film thickness of said first magnetic film.

3. A combined type thin film magnetic head according to claim 1, wherein:
   said second magnetic film is provided with a second pole portion; and
   a width of said second pole portion is set approximately equal to said width of said first pole portion.

4. A combined type thin film magnetic head according to claim 3, wherein:
   said gap film is provided between said second pole portion and said first pole portion; and
   said film thickness of said non-magnetic film is set smaller than a film thickness of said gap film.

5. A combined type thin film magnetic head according to claim 1, wherein:
   said non-magnetic film is constituted of a metal film constituted of Au, Ag, Ti or Ta.

6. A combined type thin film magnetic head according to claim 1, wherein:
   said magnetoresistive conversion element has a spin valve film structure.

7. A combined type thin film magnetic head according to claim 6, wherein:
   said spin valve film structure includes a first ferromagnetic film, a non-magnetic film, a second ferromagnetic film and an anti-ferromagnetic film;
   said first ferromagnetic film and said second ferromagnetic film, are separated from each other by said non-magnetic film; and
   said anti-ferromagnetic film is coupled to either said first ferromagnetic film or said second ferromagnetic film.

8. A combined type thin film magnetic head comprising:
   a magnetoresistive conversion element including a magnetoresistive film, a first magnetic shield film and a second magnetic shield film with said first magnetic shield film and said second magnetic shield film provided at either side of said magnetoresistive film; and
   an inductive conversion element being provided with a thin film magnetic circuit constituted with a first magnetic film, a coil film supported by an insulating film, a second magnetic film and a gap film, and being combined with said magnetoresistive conversion element with said first magnetic film placed as if to be adjacent to said second magnetic shield film, said first magnetic film and said second magnetic shield film are separated from each other by a non-magnetic film with a film thickness of said non-magnetic film selected at a value such that magnetic coupling is induced between said second magnetic shield film and said first magnetic film and said first magnetic film is provided with a first pole portion with a width thereof set smaller than a width of said second magnetic shield film, and a saturation magnetization of said first magnetic film is higher than a saturation magnetization of said second magnetic shield film, wherein
   said saturation magnetization of said second magnetic shield film is less than 10 kGauss; and
   said saturation magnetization of said first magnetic film is at or more than 10 kGauss.

9. A combined type thin film magnetic head according to claim 8, wherein:
   said second magnetic shield film is constituted of an alloy film that includes at least one of Ni, Fe, Ta and Ti, or constituted of a Co group amorphous alloy film; and
   said first magnetic film is constituted of an alloy film that includes Fe, Zr and N.

10. A combined type thin film magnetic head according to claim 9, wherein:

said non-magnetic film is constituted of a metal film constituted of Au, Ag, Ti or Ta.

11. A combined type thin film magnetic head according to claim 8, wherein;

said film thickness of said non-magnetic film is smaller than said film thickness of said second magnetic shield film or a film thickness of said first magnetic film.

12. A combined type thin film magnetic head according to claim 8, wherein:

said second magnetic film is provided with a second pole portion; and a width of said second pole portion is set approximately equal to said width of said first pole portion.

13. A combined type thin film magnetic head according to claim 12, wherein:

said gap film is provided between said second pole portion and said first pole portion; and said film thickness of said non-magnetic film is set smaller than a film thickness of said gap film.

14. A combined type thin film magnetic head according to claim 8, wherein:

said magnetoresistive conversion element has a spin valve film structure.

15. A combined type thin film magnetic head according to claim 14, wherein:

said spin valve film structure includes a first ferromagnetic film, a non-magnetic film, a second ferromagnetic film and an anti-ferromagnetic film;

said first ferromagnetic film and said second ferromagnetic film, are separated from each other by said non-magnetic film; and said anti-ferromagnetic film is coupled to either said first ferromagnetic film or said second ferromagnetic film.

* * * * *

UNITED STATES PATENT AND TRADEMARK OFFICE
CERTIFICATE OF CORRECTION

PATENT NO. : 5,850,325
DATED : December 15, 1998
INVENTOR(S) : Daisuke MIYAUCHI et al.

It is certified that error appears in the above-identified patent and that said Letters Patent is hereby corrected as shown below:

On the title page, Item [54] and Column 1, lines 1-7, the title should read:

--MAGNETIC HEAD HAVING A READ ELEMENT UPPER SHIELD FILM AND A WRITE ELEMENT LOWER MAGNETIC FILM SEPARATED BY A NON-MAGNETIC FILM HAVING A THICKNESS SUCH THAT MAGNETIC COUPLING IS INDUCED THEREBETWEEN--

Signed and Sealed this

Twentieth Day of July, 1999

Attest:

Q. TODD DICKINSON

*Attesting Officer*  *Acting Commissioner of Patents and Trademarks*